(12) United States Patent
Myers

(10) Patent No.: US 6,778,614 B1
(45) Date of Patent: *Aug. 17, 2004

US006778614B1

(54) COMPLEX BASEBAND ENVELOPE COMPUTATION

(75) Inventor: Michael H. Myers, Poway, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 823 days.

This patent is subject to a terminal disclaimer.

(21) Appl. No.: 09/690,640

(22) Filed: Oct. 17, 2000

(51) Int. Cl.[7] ............................................. H04L 27/22
(52) U.S. Cl. ....................................................... 375/332
(58) Field of Search ................................ 375/322, 332, 375/316, 377

(56) References Cited

U.S. PATENT DOCUMENTS 4,926,443 A * 5/1990 Reich .......................... 375/349
2002/0150171 A1 * 10/2002 Myers ......................... 375/296

FOREIGN PATENT DOCUMENTS

EP          1176777 A2 *  1/2002   ........... H04L/27/36

* cited by examiner

Primary Examiner—Khai Tran
Assistant Examiner—Kevin M Burd
(74) Attorney, Agent, or Firm—John A. Miller; Warn, Hoffmann, Miller & LaLone, P.C.

(57) ABSTRACT

An apparatus for and a method of determining the envelope of a complex baseband signal having an in-phase component I and a quadrature component Q by determining $(I^2+Q^2)^{1/2}$ for sampled values of the baseband signal. The maximum and minimum values of I and Q are detected by detecting the larger of I and Q in a first detection circuit (18) and the smaller of I and Q in a second detection circuit (20). A value x=½{(the detected minimum value)÷(the detected maximum value)}² is calculated in a first calculation circuit (22). The value of $(I^2+Q^2)^{1/2}$ is then calculated based on the value of x. In a first embodiment the value of $(I^2+Q^2)^{1/2}$ is calculated in a second calculation circuit (24, 26, 28, 30, 32, 34, 36, 38) as the (the detected maximum value)×(1+x)/2+½(1+x−$x^2$+$x^3$−$x^4$+$x^5$−$x^6$). In a second embodiment, the value of $(I^2+Q^2)^{1/2}$ is calculated in a second calculation circuit (50, 52, 54, 56, 58, 60, 62) as (the detected maximum value)×(1+2x+$x^2$/2)÷(1+x). Preferably, the apparatus is implemented in a gate array, such as a field programmable gate array, providing high speed operation.

20 Claims, 2 Drawing Sheets

COMPLEX BASEBAND ENVELOPE COMPUTATION

FIELD OF THE INVENTION

The present invention pertains to an apparatus for and a method of determining an approximation of the envelope of a complex baseband signal having an in-phase component I and a quadrature component Q. More particularly, the present invention pertains to an apparatus for and a method of determining such envelope in a computationally efficient manner, permitting implementation in a gate array to provide high speed operation.

BACKGROUND OF THE INVENTION

In digital radio, it is desirable to be able to compute the envelope of the baseband signal with minimal distortion. When transmitting a modulated radio signal, it is desirable to maintain out of band emissions at an extremely low level by minimizing the distortion in the output of the power amplifier. When demodulating a received amplitude modulated signal, it is also desirable to minimize the distortion in the envelope computation. In order to accomplish these, it is necessary to accurately and rapidly compute the envelope of the modulated signal. The envelope comprises two components; namely, an in-phase component I and a quadrature component Q. Determination of the envelope can readily be achieved by determining the square root of the sum of the squares of I and Q for each value of I and Q.

In embedded real time digital implementations, determination of the square root of a complex signal requires a significant number of clock cycles utilizing software, or a significant number of logic blocks utilizing firmware. It is desirable to minimize the number of clock cycles or logic blocks required. To achieve envelope predistortion required for linear transmission of differential eight phase shift keying (D8PSK) waveforms, such as required by International Civil Aviation Organization Mode 2 specifications, the envelope must be computed as accurately as possible so as to avoid spectral spurs. A common approximation of the square root is obtained by adding the maximum of the absolute values of I or Q to three-eighths the minimum values of I or Q. However, this approximation is not sufficiently accurate for use in transmit envelope predistortion, particularly when the values of I and Q are almost equal. While look-up tables could be used, a different look-up table would be required for each power level, requiring a significant amount of memory. It is desirable to determine the square root in a gate array, so as to obtain the resulting advantage of high speed. However, gate arrays are not practical for the large number of look-up tables required because of their limited memory.

SUMMARY OF THE INVENTION

The present invention is an apparatus for and a method of determining the envelope of a complex baseband signal having an in-phase component I and a quadrature component Q. In accordance with the present invention, the square root of the sum of the squares of the values of I and Q is determined as a value of the envelope. A polynomial representation of the square root, which deviates only slightly from a true square root polynomial, is utilized. In one embodiment of the present invention, a simplified alternating series polynomial, in the form of a sixth-order polynomial with unity coefficients, is used to approximate the square root. A second embodiment of the invention utilizes a ratio of two polynomials to provide a somewhat less accurate, but still usable, approximation of the square root. Preferably, the apparatus is implemented in a gate array.

BRIEF DESCRIPTION OF THE DRAWINGS

These and other aspects and advantages of the present invention are more apparent from the following detailed description and claims, particularly when considered in conjunction with the accompanying, drawings. In the drawings:

DETAILED DESCRIPTION OF PREFERRED EMBODIMENT

Figure 1:
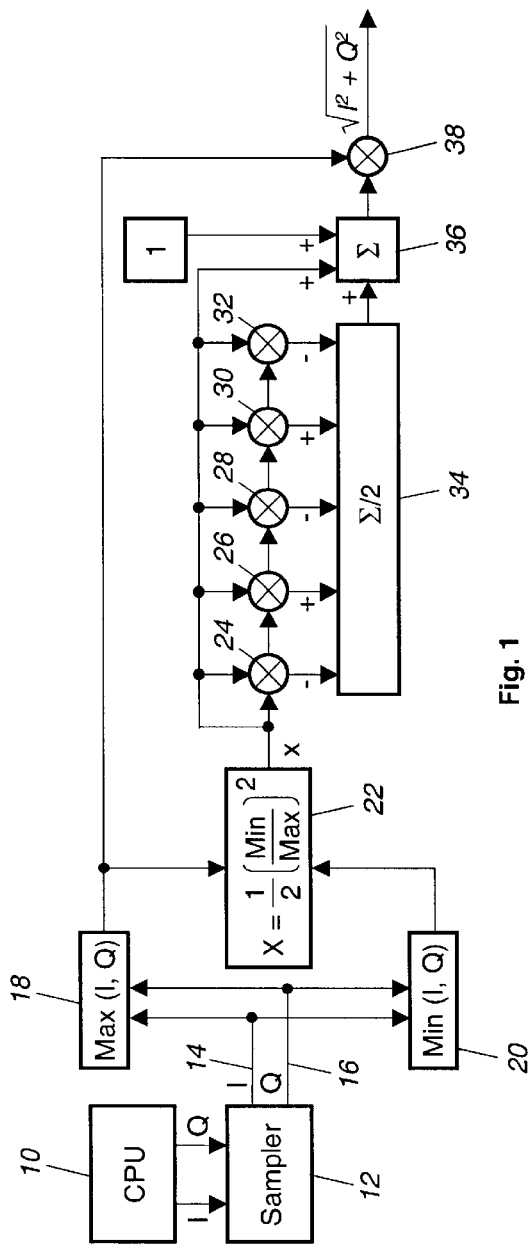
FIG. 1 is a block diagram of a first embodiment of an apparatus for determining the envelop of a complex baseband signal in accordance with the present invention.

FIG. 1 is a block diagram of an apparatus for determining an approximation of the envelope of a complex baseband signal having an in-phase component I and a quadrature component Q in accordance with a first embodiment of the present invention. The in-phase components and the quadrature component of the baseband signal from a source such as a CPU 10 are sampled at, for example, 52.5 kilo samples per second (KSPS) by sampling circuit 12. The sampled in-phase and quadrature signals are applied by lines 14 and 16, respectively, to a first detection circuit 18 which determines the maximum of these components by determining for each sample whether the I component or the Q component is the larger. The I component and the Q component samples are also applied by lines 14 and 16 to a second detection circuit 20 which determines the minimum of these components by determining for each sample whether the I component or the Q component is the smaller. The detected maximum value ("max") and the detected minimum value ("min") for each sample are applied to calculation circuit 22 which computes the value $x=\frac{1}{2} (min/max)^2$.

The x output from calculation circuit 22 is applied as an input to each of five multiplier circuits 24, 26, 28, 30 and 32. The x output is also applied to a second input of multiplier 24. As a consequence, multiplier 24 provides as an output the value $x^2$. This $x^2$ output from multiplier 24 is applied to the second input of multiplier 26 and to a negative input to summation circuit 34. The output of multiplier 26 is thus the value $x^3$. This output is applied to the second input of multiplier 28 and to a positive input of summation circuit 34. Multiplier 28 accordingly provides the output $x^4$ which is used as the second input to multiplier 30 and which is applied to a negative input to summation circuit 34. Multiplier 30 then provides the output $x^5$ to the second input of multiplier 32 and to a positive input to summation circuit 34. Multiplier 32 provides the output $x^6$ to a negative input to summation circuit 34.

Figure 2:
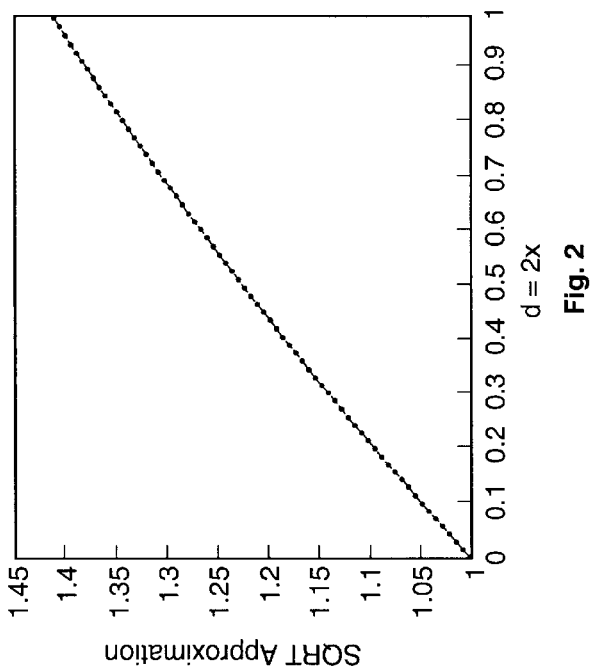
FIG. 2 is a graph depicting the square root as calculated in accordance with the embodiment of FIG. 1 compared to the true square root.

Summation circuit 34 divides the sum of its inputs by 2, thus providing as its output the value $\frac{1}{2} (-x^2+x^3-x^4+x^5-x^6)$. This signal is applied as an input to summation circuit 36, which also receives as inputs the x signal from calculation circuit 22 and the constant 1. The output of summation circuit 36 is thus the value $\{1+x+\frac{1}{2}(-x^2+x^3-x^4+x^5-x^6)\}$. This is equal to the value $\{(1+x)/2+\frac{1}{2}(1+x-x^2+x^3-x^4+x^5-x^6)\}$. This signal is applied from summation circuit 36 to one input of multiplier 38, which receives the max signal from detection circuit 18 at its second input. Consequently, the output of multiplier 38 is $$(\max)\times\{(1+x)/2+\frac{1}{2}(1+x-x^2+x^3-x^4+x^5-x^6)\}$$

which is an approximation of $(I^2+Q^2)^{1/2}$. It has been found that this approximation of the value $(I^2+Q^2)^{1/2}$ is accurate with an error of less than 0.039% RMS. FIG. 2 is a graph depicting in a dotted line the true square root values and in a solid line the approximations obtained with the apparatus and method of FIG. 1.

Figure 3:
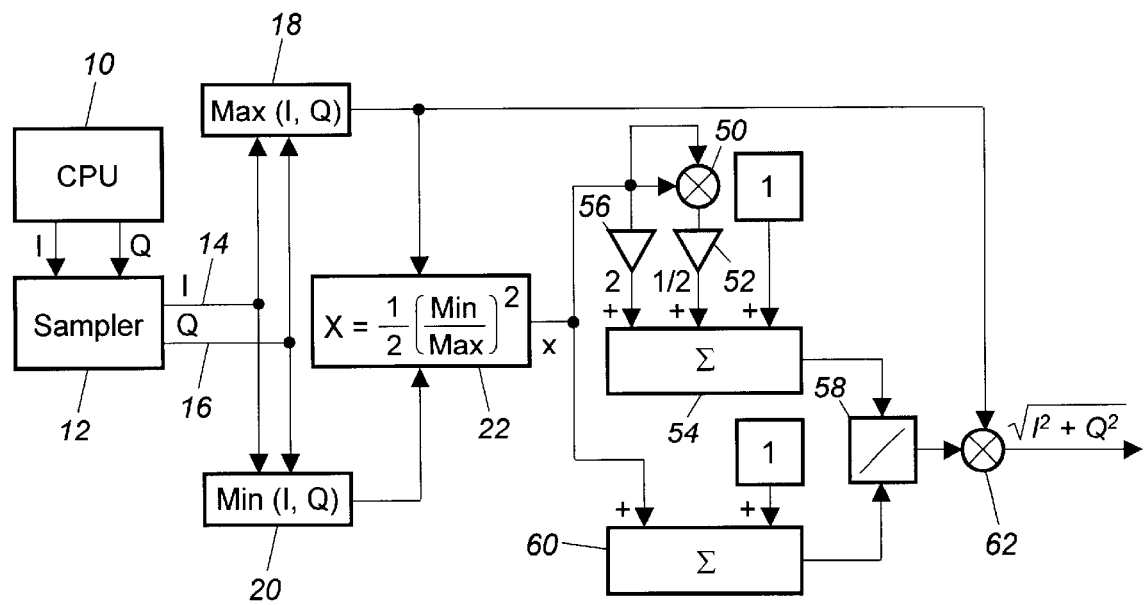
FIG. 3 is a block diagram of a second embodiment of an apparatus for determining the envelop of a complex baseband signal in accordance with the present invention.

FIG. 3 is a block diagram of an apparatus for determining an approximation of the envelope of complex baseband signal having an in-phase component I and a quadrature Q in accordance with a second embodiment of the present invention. Again, the I and Q components of the baseband signal from a source 12 are provided on lines 14 and 16, respectively, to first and second detection circuits 18 and 20. As in FIG. 1, detection circuits 18 and 20 determine the max I,Q and min I,Q values and apply them to calculating circuit 22 which provides the output x=½ (min/max)². The x signal is applied to the two inputs of multiplier 50, the output of which ICES is provided through amplifier 52 to a positive input of summation circuit 54. Amplifier 52 has a gain of one-half, and so its output is equal to ½ x². The x signal from calculation circuit 22 is also applied as the input to amplifier 56 which has a gain of two. The output of that amplifier is equal to 2x and is applied to another positive input to summation circuit 54. Summation circuit 54 also receives at a positive input the constant 1, and so the output of summation circuit 54 is equal to (1+2x+½ x²). This output is applied to the numerator input of dividing circuit 58.

The x signal from calculation circuit 22 is also applied to a positive input of summation circuit 60, which receives the constant 1 at a second positive input. The output of summation circuit 60 is thus the value (1+x) and is applied to the denominator input of dividing circuit 58. Accordingly, the output of dividing circuit 58 is the value $\{(1+2x+\frac{1}{2}x^2)\div(1+x)\}$. This output is applied to one input of multiplier 62. The max signal from detection circuit 18 is applied to the second input of multiplier 62. The output of multiplier 62 is accordingly the value $$(\max)\times(1+2x+\tfrac{1}{2}x^2)\div(1+x),$$

which is an approximation of $(I^2+Q^2)^{1/2}$.

Figure 4:
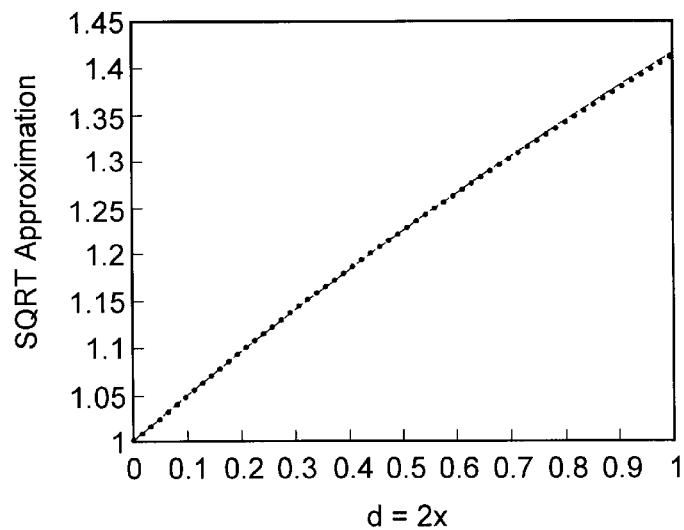
FIG. 4 is a graph depicting the square root as calculated in accordance with the embodiment of FIG. 3 compared to the true square root.

It has been found that this approximation of the value of $(I^2+Q^2)^{1/2}$ is accurate to an error of less than 0.1% RMS. Although this is somewhat less accurate that the embodiment of FIG. 1, the embodiment of FIG. 3 is less costly to implement. FIG. 4 is a graph depicting in a dotted line the true square root values and in a solid line the approximations obtained with the apparatus and method of FIG. 3.

The values of $(I^2+Q^2)^{1/2}$ which are obtained for the samples define the envelope of the baseband signal from CPU 10. Detection circuits 18 and 20, calculation circuit 22, multipliers 24, 26, 28, 30, 32, 38, 50 and 52 summation circuits 34, 36, 54, and 60, amplifiers 52 and 56, and dividing circuit 58 might be implemented in any of several manners, including software, firmware, or hardware. High speed operation can be provided by implementing these components in a gate array, such as a field programmable gate array.

Although the present invention has been described with reference to preferred embodiments, various rearrangements, alterations, and substitutions could be made, and still the result would be within the scope of the invention.

What is claimed is:

1. Apparatus for determining a value $(I^2+Q^2)^{1/2}$, where I and Q are, respectively, the value of an in-phase component and the value of a corresponding quadrature component of a complex baseband signal, said apparatus comprising:
   a first detection circuit for detecting the maximum value of I and Q by determining the larger of I and Q;
   a second detection circuit for detecting the minimum value of I and Q by determining the smaller of I and Q;
   a first calculation circuit for calculating a value x=½{(the detected minimum value)÷(the detected maximum value)}²; and
   a second calculation circuit responsive to the calculated value x for calculating a value of $(I^2+Q^2)^{1/2}$.

2. Apparatus as claimed in claim 1, wherein said second calculation circuit includes a binomial expansion circuit for calculating the value of $(I^2+Q^2)^{1/2}$ as a function of the truncated binomial series $1+x-x^2+x^3-x^4+x^5-x^6$.

3. Apparatus as claimed in claim 2, wherein said second calculation circuit calculates the value of $(I^2+Q^2)^{1/2}$ as:

$$(\text{the detected maximum value})\times\{(1+x)/2+\tfrac{1}{2}(1+x-x^2+x^3-x^4+x^5-x^6)\}.$$

4. Apparatus as claimed in claim 1, wherein said second calculation circuit calculates the value of $(I^2+Q^2)^{1/2}$ as (the detected maximum value)$\times(1+2x+x^2/2)\div(1+x)$.

5. Apparatus as claimed in claim 1, wherein said first and second detection circuits and said first and second calculation circuits comprise a gate array.

6. Apparatus as claimed in claim 5, wherein said gate array is a field programmable gate array.

7. Apparatus for determining the envelope of a complex baseband signal having an in-phase component I and a corresponding quadrature component Q, said apparatus comprising:
   a first detection circuit for detecting the maximum value of I and Q by determining the larger of I and Q;
   a second detection circuit for detecting the minimum value of I and Q by determining the smaller of I and Q;
   a first calculation circuit for calculating a value x=½{(the detected minimum value)÷(the detected maximum value)}²; and
   a second calculation circuit responsive to the calculated value x for calculating a value of $(I^2+Q^2)^{1/2}$ as a value of the envelope.

8. Apparatus as claimed in claim 7, wherein said second calculation circuit includes a binomial expansion circuit for calculating the value of $(I^2+Q^2)^{1/2}$ as a function of the truncated binomial series $1+x-x^2+x^3-x^4+x^5-x^6$.

9. Apparatus as claimed in claim 8, wherein said second calculation circuit calculates the value of $(I^2+Q^2)^{1/2}$ as:

$$(\text{the detected maximum value})\times\{(1+x)/2+\tfrac{1}{2}(1+x-x^2+x^3-x^4+x^5-x^6)\}.$$

10. Apparatus as claimed in claim 7, wherein said second calculation circuit calculates the value of $(I^2+Q^2)^{1/2}$ as (the detected maximum value)$\times(1+2x+x^2/2)\div(1+x)$.

11. Apparatus as claimed in claim 7, wherein said first and second detection circuits and said first and second calculation circuits comprise a gate array.

12. Apparatus as claimed in claim 11, wherein said gate array is a field programmable gate array.

13. A method of determining a value $(I^2+Q^2)^{1/2}$, where I and Q are respectively the value of an in-phase component and the value of a corresponding quadrature component of a complex baseband signal, said method comprising:
   (a) detecting the maximum value of I and Q by determining the larger of I and Q;
   (b) detecting the minimum value of I and Q by determining the smaller of I and Q;
   (c) calculating a value x=½{(the detected minimum value)÷(the detected maximum value)}$^2$; and
   (d) calculating a value of $(I^2+Q^2)^{1/2}$ as a function of x.

14. A method as claimed in claim 13, wherein step (d) comprises calculating the value of $(I^2+Q^2)^{1/2}$ as a function of the binomial series $1+x-x^2+x^3-x^4+x^5-x^6$.

15. A method as claimed in claim 14, wherein step (d) comprises calculating the value of $(I^2+Q^2)^{1/2}$ as (the detected maximum value)×{(1+x)/2+½ $(1+x-x^2+x^3-x^4+x^5-x^6)$}.

16. A method as claimed in claim 13, wherein step (d) comprises calculating the value of $(I^2+Q^2)^{1/2}$ as (the detected maximum value)×$(1+2x+x^2/2)$ +(1+x).

17. A method of determining the envelope of a complex baseband signal having an in-phase component I and a corresponding quadrature component Q, said apparatus comprising the steps of:
   (a) detecting the maximum value of I and Q by determining the larger of I and Q;
   (b) detecting the minimum value of I and Q by determining the smaller of I and Q;
   (c) calculating a value x=½{(the determined minimum values)÷(the determined maximum values)}$^2$; and
   (d) calculating a value of $(I^2+Q^2)^{1/2}$ as a function of x to provide a value of the envelope.

18. A method as claimed in claim 17, wherein step (d) comprises calculating the value of $(I^2+Q^2)^{1/2}$ as a function of the truncated binomial series $1+x-x^2+x^3-x^4+x^5-x^6$.

19. A method as claimed in claim 18, wherein step (d) comprises calculating the value of $(I^2+Q^2)^{1/2}$ as (the detected maximum value)×{(1+x)/2+½ $(1+x-x^2+x^3-x^4+x^5-x^6)$}.

20. A method as claimed in claim 17, wherein step (d) comprises calculating the value of $(I^2+Q^2)^{1/2}$ as (the detected maximum value)×{$(1+2x+x^2/2)$+(1+x)}.

* * * * *